F. MOHN.
CLUTCH MECHANISM.
APPLICATION FILED FEB. 28, 1918.
1,356,650.
Patented Oct. 26, 1920.
2 SHEETS—SHEET 1.
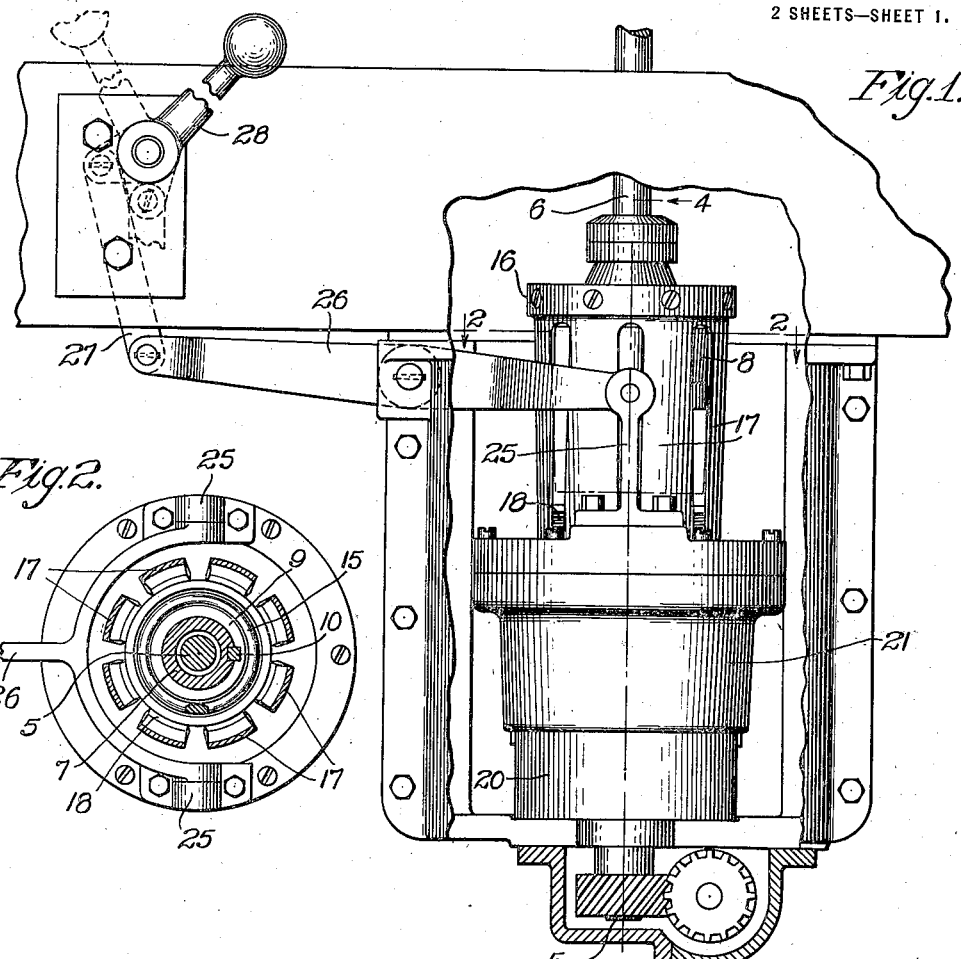
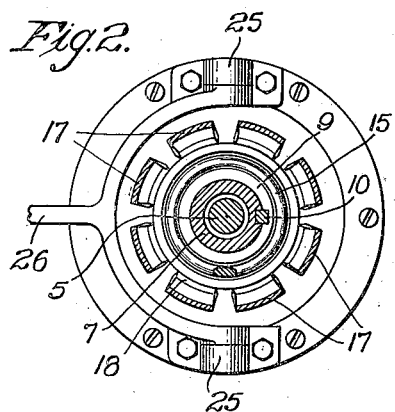
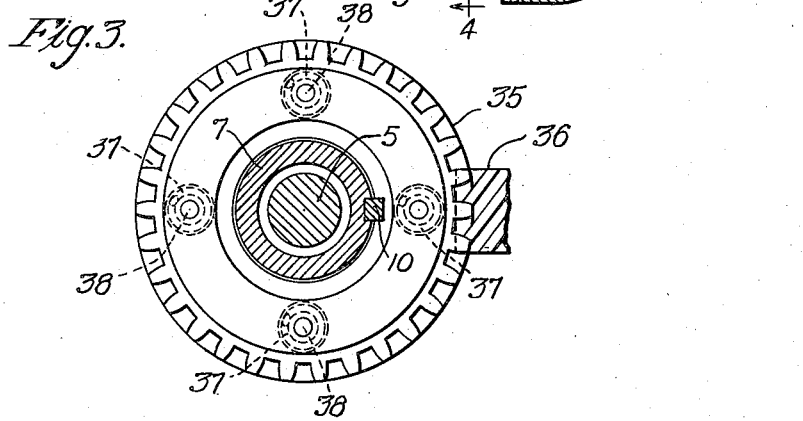
Inventor
Finn Mohn
by J. G. Roberts
Atty.

F. MOHN.
CLUTCH MECHANISM.
APPLICATION FILED FEB. 28, 1918.

1,356,650.

Patented Oct. 26, 1920.
2 SHEETS—SHEET 2.

Inventor
Finn Mohn
by J. G. Roberts
Atty.

UNITED STATES PATENT OFFICE.

FINN MOHN, OF CHICAGO, ILLINOIS, ASSIGNOR TO WESTERN ELECTRIC COMPANY, INCORPORATED, OF NEW YORK, N. Y., A CORPORATION OF NEW YORK.

CLUTCH MECHANISM.

1,356,650.   Specification of Letters Patent.   Patented Oct. 26, 1920.

Application filed February 28, 1918. Serial No. 219,598.

*To all whom it may concern:*

Be it known that I, FINN MOHN, a citizen of the United States, residing at Chicago, in the county of Cook and State of Illinois, have invented certain new and useful Improvements in Clutch Mechanisms, of which the following is a full, clear, concise, and exact description.

This invention relates to clutch mechanisms and has for its object to provide a compact and simple clutch mechanism by means of which a driving member rotating at a substantially constant speed may be connected with a driven member in a manner to gradually accelerate the driven member from a position of rest to its normal speed without sudden starts or jerks.

In accordance with the general features of this invention, coöperating friction clutch members on the driving and driven members are provided with means which operate automatically in response to the operation of a clutch controlling member to cause the clutch members to be moved into engagement with each other with a constantly increasing pressure. In the preferred embodiment of this invention the two clutch members are provided with coöperating portions adapted upon engagement to cause one to be fed toward the other by the rotation of the driving member and at a gradually diminishing speed dependent upon the difference in speeds of the driving and driven members. Resilient means are provided which assist in the prevention of sudden starts or jerks in the engagement of the clutch members.

Spring pressed means are provided for positively disengaging the clutch members when the clutch controlling member is released, and cushioning means are provided for receiving the movable clutch member when it is released.

In the drawings:—

Figure 1 is a view in front elevation with parts broken away showing the clutch mechanism of this invention in assembly;

Fig. 2 is a transverse sectional view taken upon line 2—2 of Fig. 1;

Fig. 3 is a sectional view taken upon line 3—3 of Fig. 4, and

Figure 4:
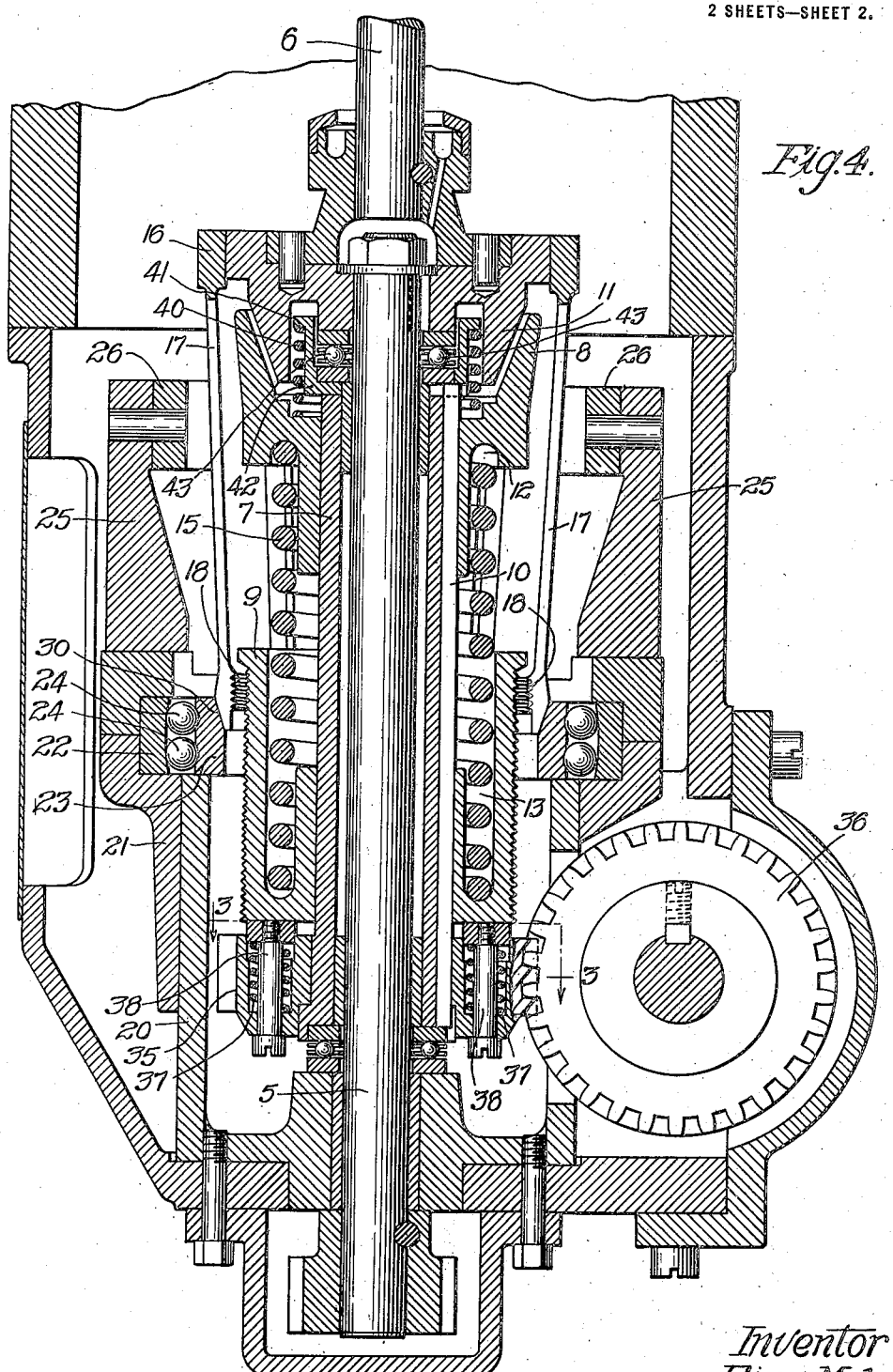
Fig. 4 is a longitudinal sectional view of the clutch mechanism taken upon line 4—4 of Fig. 1.

As shown in the drawings and particularly Fig. 4, 5 designates a driven shaft and 6 an extension thereof. Rotatably mounted upon the driven shaft is a sleeve 7 upon which are slidably mounted a clutch member 8 and a clutch controlling member 9, which are secured to rotate with the sleeve by means of a spline 10. The clutch member 8 is coned or dished inwardly to coöperate with a cone clutch member 11 keyed to the driven shaft 5. The clutch controlling member 9 is provided on its exterior with screw threads for the purpose hereinafter described, and both the upper and lower members 8 and 9 are provided with annular recesses 12 and 13, into which the opposite ends of a coil spring 15, surrounding the sleeve 7, fit. The spring 15 when in its normal position is fully relaxed. Secured to the clutch member 11 on the driven shaft is a shell 16 provided with a plurality of downwardly extending arms 17, 17 tensioned to normally spread apart and each provided on its lower end with an interiorly threaded portion 18 adapted to coöperate with the exterior threads of the lower member 9.

Slidably mounted upon a rigid sleeve member 20 surrounding the lower end of the sleeve 7 and the lower member 9 is a sleeve 21. This sleeve 21 carries a ball race bearing comprising an outer fixed ring 22 and an inner rotatable ring 23 separated by the ball bearings 24, 24. Pivotally secured to upwardly extending arms 25, 25 on the slidable sleeve 21 is a pivotally supported lever arm 26 (Fig. 1) which is connected through a pivotal link 27 with an operating lever arm 28, by means of which the slidable sleeve 21 is raised and lowered to control the engagement and disengagement of the clutch members. This is brought about in the following manner.

As will be seen by reference to Fig. 4, the rotatable ring 23 is provided with an inner sloping face 30 which engages with corresponding outer faces on the lower ends of the arms 17, 17 which normally rest against the sloping face 30 of the ring 23. The upward movement of the slidable sleeve 21 causes this ring 23 to compress the arms 17, 17 to bring the threads thereon into engagement with the threads upon the lower member 9. Upon engagement of these threads the member 9, which rotates with the sleeve 7, is fed upwardly and this upward movement is transmitted to the clutch member 8 through the spring 15 to bring it into engagement with the clutch member 11 on the driven shaft 5. As the clutch member 8 moves into engagement with the clutch member 11 and the latter member begins to accelerate, the relative speed of the lower member 9 and the clutch member 11 decreases, thereby decreasing the rate at which the member 9 is fed upwardly on the sleeve 7 until this movement of the member 9 entirely ceases when the driving and driven members are rotating at the same rate of speed. Any relative changes of speed between the two members, however, will cause a corresponding change in the pressure between the two clutch members 8 and 11, thereby preventing sudden jerks on the driven member.

A spiral gear 35 secured to the lower end of the sleeve 7 and driven by a spiral gear 36 is provided with cushioning springs 37, 37 and plungers 38, 38 to receive the lower member 9 when the lever arm 28 is moved to release the clutch members from engagement.

Surrounding the driven shaft 5 near its upper end is a spring 40, the lower end of which rests upon the clutch member 8 and the upper end of which bears against a shoulder 41 on a ring 42 surrounding the shaft 5. This spring serves to positively disengage the clutch members 8 and 11 when the member 9 returns to normal position.

Ball bearings 43, 43 are interposed between the clutch members 8 and 11.

A clutch of the class described is particularly useful in connection with machines used for winding insulating material about wires, in which machines it is of the utmost importance that the winding head which winds the insulating material about the wire be started at a low speed and gradually accelerated without jerks in order to avoid breaking the insulating material which ordinarily has a very low tensile strength. The invention, however, is not limited in its application to machines of this particular character since it may be used in connection with any mechanism when a gradual and smooth acceleration between a driving and a driven member is desirable.

What is claimed is:

1. In combination, a driven member, a friction clutch member carried thereby, arms extending downwardly from said clutch member and provided with screw threaded portions adapted to be moved into an engaging position, a driving member, upper and lower members rotatable with said driving member but longitudinally movable thereon, the upper of said members on the driving member being adapted to engage the clutch member on the driven member and the lower of said members being provided with exterior screw threads adapted to be engaged by the threaded portions of the arms, resilient connecting means between the upper and lower members of the driving member, and means for moving the threaded portions of the arms into engagement with the threads of said lower member.

2. In combination, a driven member, a friction clutch member carried thereby, spring arms extending downwardly from said clutch member and provided at their ends with interior screw threaded portions, a driving member, upper and lower members rotatable with said driving member but longitudinally movable thereon, the upper of said members on the driving member being adapted to engage the clutch member on the driven member and the lower of said members being provided with exterior screw threads adapted to be engaged by the threaded portions of the spring arms, resilient connecting means between the upper and lower members of the driving member, and means for pressing the threaded portions of the spring arms into engagement with the threads of said lower member.

In witness whereof, I hereunto subscribe my name this 18th day of February, A. D. 1918.

FINN MOHN.